US012585023B1

(12) United States Patent
Lacaze et al.

(10) Patent No.: US 12,585,023 B1
(45) Date of Patent: Mar. 24, 2026

(54) SYSTEMS AND METHODS FOR A FIRST AUTONOMOUS VEHICLE TO IDENTIFY AND UTILIZE A UNIQUE LIDAR PROJECTED PATTERN OF A SECOND AUTONOMOUS VEHICLE

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 936 days.

(21) Appl. No.: 17/856,006

(22) Filed: Jul. 1, 2022

Related U.S. Application Data

(60) Provisional application No. 63/218,364, filed on Jul. 4, 2021, provisional application No. 63/217,742, filed on Jul. 1, 2021.

(51) Int. Cl.
*G01S 17/931* (2020.01)
*G01S 17/89* (2020.01)

(52) U.S. Cl.
CPC ............ *G01S 17/931* (2020.01); *G01S 17/89* (2013.01)

(58) Field of Classification Search
None
See application file for complete search history.

(56) References Cited

U.S. PATENT DOCUMENTS

| | | | |
|---|---|---|---|
| 10,935,991 B2 * | 3/2021 | Choi ........................ | G05D 1/12 |
| 2022/0268930 A1 * | 8/2022 | Jo ........................ | G01S 7/4865 |

OTHER PUBLICATIONS

Lahmeri, Mohamed-Amine, et al. "UAV Formation and Resource Allocation Optimization for Communication-Assisted 3D InSAR Sensing." IEEE Transactions on Communications (2025). (Year: 2025).*

* cited by examiner

*Primary Examiner* — Luke D Ratcliffe

(74) *Attorney, Agent, or Firm* — RowanTree Law Group, PLLC; Carson C.K. Fincham

(57) ABSTRACT

Systems and methods for causing a first autonomous vehicle (e.g., a drone or other aerial vehicle) to utilize a LIDAR pattern being emitted by a LIDAR device of a second autonomous vehicle (e.g., a ground vehicle) to determine one or more characteristics of the second vehicle. The one or more characteristics may comprise, for example, (i) a make and/or model of a manufacturer of the LIDAR device and/or the second vehicle; and (ii) a particular unit of the LIDAR device and/or the second vehicle. The first vehicle may further utilize the LIDAR pattern of the second vehicle to perform other operations, such as mapping a 3-D model of the environment being traversed by the second vehicle.

25 Claims, 11 Drawing Sheets

100

REMOTE SERVER 130

NETWORK 104

PASSIVE FOLLOWER VEHICLE

110

POWER DEVICE 134

PROPULSION DEVICE 132

COMMUNICATION DEVICE 114

PROCESSING DEVICE 112

140
MEMORY DEVICE

LOCATION DEVICE 116b

MANEUVER DEVICE 118

SENSOR 116c

INPUT DEVICE 116a

OBJECT VEHICLE ENVIRONMENT 102

ENVIRONMENT FEATURE 102-1

STATIONARY OBJECT          MOVING OBJECT          SUB-SCAN

SYSTEMS AND METHODS FOR A FIRST AUTONOMOUS VEHICLE TO IDENTIFY AND UTILIZE A UNIQUE LIDAR PROJECTED PATTERN OF A SECOND AUTONOMOUS VEHICLE

CROSS-REFERENCE TO RELATED APPLICATION(S)

This application claims benefit of and priority under 35 U.S.C. § 119(e) to, and is a non-provisional of, (i) U.S. Provisional Patent Application No. 63/217,742 filed on Jul. 1, 2021 and titled "SYSTEMS AND METHODS FOR FACILITATING A VEHICLE TO FOLLOW LADAR PROJECTED PATTERNS," and (ii) U.S. Provisional Patent Application No. 63/218,364 filed on Jul. 4, 2021 and titled SYSTEMS AND METHODS FOR PASSIVE 3D MAPPING. Each of these Provisional Patent Applications is hereby incorporated by reference herein, in its entirety and for all purposes.

FIELD

The present disclosure relates generally to autonomous vehicles, and more particularly, to systems and methods in which a first vehicle (e.g., a passive observer vehicle) is operable to detect and utilize the LADAR projected pattern of a second vehicle (e.g., an object vehicle).

BACKGROUND

Various autonomous or unmanned ground vehicles, or robots (collectively "vehicles" herein), use LADARs (or LIDARs) to detect the ground or other aspects of their environment, including obstacles or features therein, such as geographical features, topography, buildings, other vehicles, people, etc. The terms LADAR (Laser Detection and Ranging) and LIDAR (Light Detection and Ranging) are used interchangeably herein to refer to detection systems, technology, equipment or instruments (collectively "LIDAR system(s)", "LIDAR device(s)" or "LIDAR" herein) that operate on the principle of radar, but use light (such as from a laser), to detect characteristics of surfaces and objects within range. LIDAR systems project light (e.g., laser) patterns on the ground and on objects (e.g., obstacles on the ground in front of them) to detect and/or measure one or more characteristics (e.g., their shape, contours, size and/or location). The light patterns comprise individual pixels that may be individually recognized and tracked. Thus, a vehicle that is equipped with a LIDAR system projects a pattern of lights (e.g., laser lights) on the ground or other surface, which it is also operable to read/detect and to process the detected data to determine characteristics (such as shape, contours, size and/or location) of the ground in front of it (or otherwise within the scope of its LIDAR pattern) and/or any objects (e.g., obstacles) thereon or features (e.g., terrain features) thereof.

SUMMARY

Applicant has recognized that a vehicle that is not equipped with its own LIDAR system may nevertheless be programmed to detect and analyze a LIDAR signal or emission (such as a LIDAR pattern) of another vehicle that is equipped with a LIDAR system. Applicant has also recognized that useful information may (e.g., unintentionally) be discernable from a LIDAR pattern being projected by the vehicle equipped with a LIDAR system. For example, different LIDAR manufacturers use different light (e.g., laser) patterns as projected by the LIDAR systems comprising their vehicles, thus allowing a manufacturer or even model of a vehicle to be identified based on the LIDAR pattern being projected by the vehicle. Such light (e.g., laser) patterns projected by LIDAR systems of vehicles are also referred to as "LIDAR patterns" or simply as "patterns" herein. Applicant has further recognized that different LIDAR manufacturers may encode in the patterns ways of uniquely identifying the particular sensor and even particular/unique vehicle units. Applicant has still further recognized that distinct units of a vehicle having LIDARs of the same manufacturer and model, may project LIDAR patterns that have measurable differences, such that a first unit of an object vehicle of a given manufacturer and model may project a pattern that is distinguishable from the pattern of a second unit of an object vehicle of the same manufacturer and model. This may be due, for example, to elements (e.g., mirrors and arrays of diodes) comprising the respective LIDARs having minute differences or imperfections that impact the pattern produced by each respective vehicle in a quantifiable manner. For example, mirrors may not be perfectly planar, creating deviations in the patterns, and/or the diodes in the arrays may have variations in brightness and beam shape. Moreover, as the LIDARs age, the emissions may change in distinct and measurable ways. Thus, Applicant has recognized that a LIDAR pattern projected by a LIDAR system of an object vehicle may be detected and utilized (e.g., by another vehicle, such as a passive follower vehicle as described herein) as an identifier of one or more of (i) a manufacturer of the object vehicle or its LIDAR system; (ii) a model of the object vehicle or its LIDAR system; and (iii) unique unit of the object vehicle or its LIDAR system. Put another way, for some purposes as described herein, a LIDAR pattern of an object vehicle may effectively serve as a fingerprint of that vehicle or its LIDAR system (e.g., a fingerprint uniquely identifying the manufacturer and model, or even a particular unit). Applicant has further recognized that the LIDAR pattern projected by the LIDAR system of an object vehicle may be used by a follower vehicle (e.g., unbeknownst to the object vehicle, such as by stealthily following the object vehicle) to determine various other data (e.g., a pose of the object vehicle, a route being traversed by the object vehicle, and/or a 3D map of the terrain or environment being traversed by the object vehicle).

Embodiments of the disclosed subject matter are directed to systems and methods that take advantage of the information inherently encoded in, or determinable from, a pattern projected by a LIDAR system. For example, in accordance with one embodiment, a first vehicle comprising a passive follower vehicle may be operable to (i) detect the LIDAR pattern projected by a second vehicle (e.g., an object vehicle); (ii) process the detected LIDAR pattern (e.g., by matching it to known LIDAR patterns of various manufacturers) to identify a characteristic of the object vehicle; and/or (iii) utilize the identified characteristic to determine data defining at least one of the object vehicle (e.g., a location and position of the object vehicle) and an environment of the object vehicle (e.g., perform terrain mapping).

The terms "passive follower vehicle", "follower vehicle" and "follower" are used interchangeably herein and, unless explicitly indicated otherwise, refer to a vehicle that is (i) following, observing, tracking, detecting, monitoring and/or evaluating (for purposes of brevity, the foregoing being referred to simply as "following" herein) a second vehicle that is projecting a LIDAR pattern; (ii) not itself (or via any components or elements thereof) projecting the LIDAR pattern (and, in some embodiments, may not even be equipped with a LIDAR projection system); and (iii) operable to detect and process the LIDAR pattern being projected by the second vehicle (e.g., by the LIDAR system of the second vehicle). The passive follower vehicle is thus referred to as such because its purpose, in at least some embodiments, may be to detect the LIDAR pattern emanating from an external source, such as the object vehicle, without itself emitting a LIDAR pattern or other signal readily detectible by the object vehicle. In accordance with some embodiments, a passive follower vehicle comprises an autonomous, or unmanned, aerial vehicle.

The terms "object vehicle", "leader vehicle" and "leader" are used interchangeably herein and, unless explicitly indicated otherwise, refer to a vehicle that is being followed, observed, tracked, monitored and/or evaluated by the passive follower vehicle. It should be noted that, in accordance with some embodiments, the passive follower vehicle is not in direct communication with the object vehicle and may very well be following the object vehicle in a stealthy manner configured to avoid or minimize the chances of detection by or on behalf of the object vehicle. In accordance with some embodiments, an object vehicle comprises an autonomous, or unmanned, ground vehicle.

Any of the various innovations and embodiments included in the disclosed subject matter herein can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Where applicable, some elements may be simplified or otherwise not illustrated in order to assist in the illustration and description of underlying features. For example, in some figures, some components have been illustrated using a partial or cutaway view in order to illustrate internal interaction of components. Throughout the figures, like reference numerals denote like elements. An understanding of embodiments described herein and many of the attendant advantages thereof may be readily obtained by reference to the following detailed description when considered with the accompanying drawings, wherein.

DETAILED DESCRIPTION

I. Introduction

Figure 1:
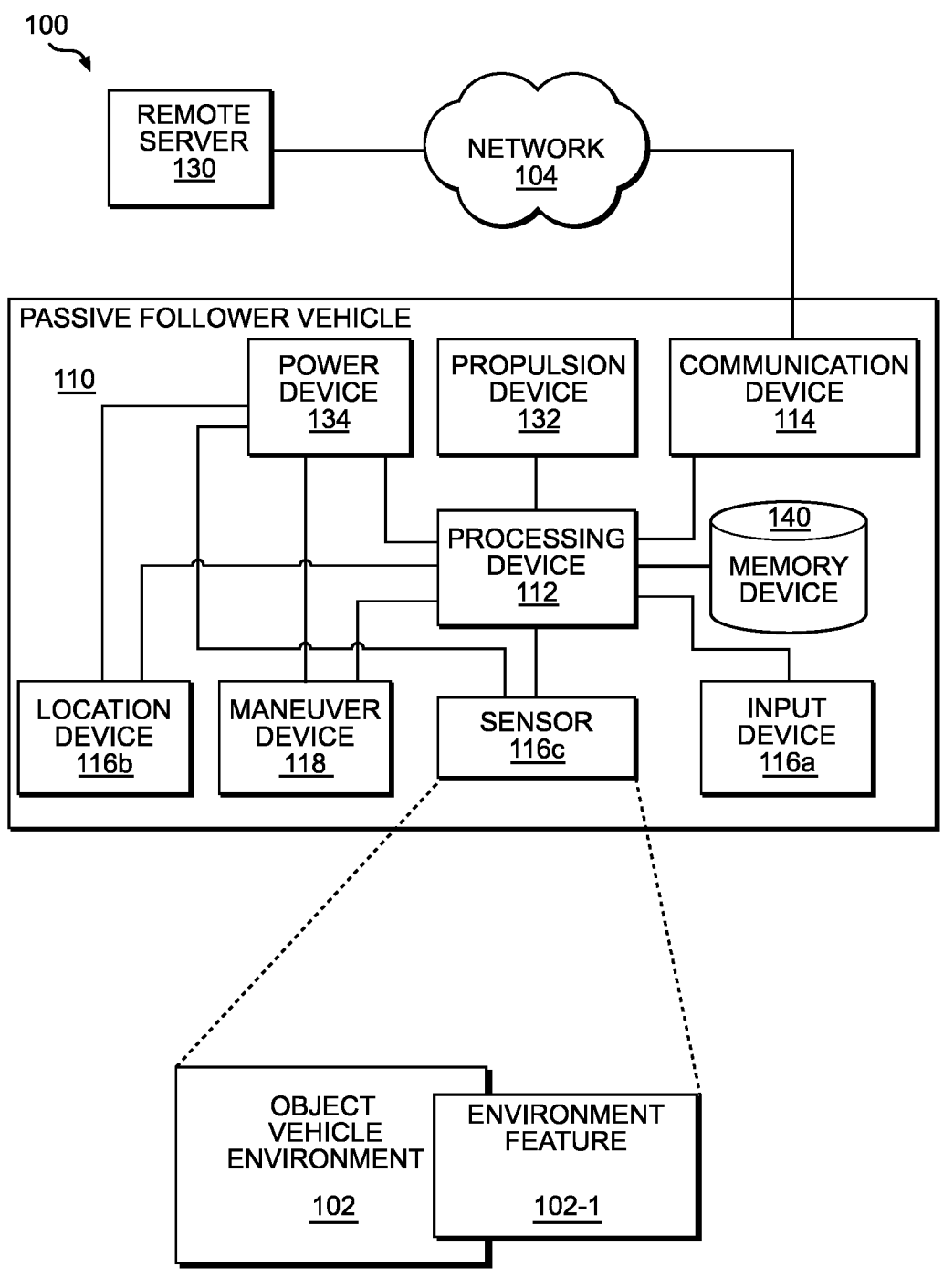
FIG. 1 is a block diagram of a system according to some embodiments.

Referring first to FIG. 1, a block diagram of a system 100 according to some embodiments is shown. In some embodiments, the system 100 may comprise an object vehicle environment 102 (e.g., comprising an environment feature 102-1, such as a LIDAR pattern of an object vehicle), a network 104, and/or a passive follower vehicle 110. The passive follower vehicle 110 may comprise, for example, a processing device 112, a communication device 114, an input device 116a, a location device 116b, a sensor 116c, and/or a maneuver device 118. In some embodiments, the passive follower vehicle 110 may be in communication with, e.g., via the network 104, a remote server 130. According to some embodiments, the passive follower vehicle 110 may comprise a propulsion device 132, a power device 134, and/or a memory device 140.

Fewer or more components 102, 102-1, 104, 110, 112, 114, 116a-c, 118, 130, 132, 134, 140 and/or various configurations of the depicted components 102, 102-1, 104, 110, 112, 114, 116a-c, 118, 130, 132, 134, 140 may be included in the system 100 without deviating from the scope of embodiments described herein. In some embodiments, the components 102, 102-1, 104, 110, 112, 114, 116a-c, 118, 130, 132, 134, 140 may be similar in configuration and/or functionality to similarly named and/or numbered components as described herein. In some embodiments, the system 100 (and/or portion thereof) may comprise a passive follower vehicle tracking and/or mapping platform programmed and/or otherwise configured to execute, conduct, and/or facilitate one or more methods as described herein.

According to some embodiments, the object vehicle environment 102 may comprise any type, configuration, and/or quantity of transportation pathways and/or areas that are or become known or desirable. The object vehicle environment 102 may comprise, for example, the ground or other surface (and corresponding area) on which an object vehicle (not separately shown) is traveling. In some embodiments, the environment feature 102-1 may comprise a LIDAR pattern being projected by the object vehicle being followed by the passive follower vehicle 100. In another embodiment, the environment feature 102-1 may comprise an object within the environment, such as a terrain feature along the route being traveled by the object vehicle.

The network 104 may, according to some embodiments, comprise a Local Area Network (LAN; wireless and/or wired), cellular telephone, Bluetooth®, Near Field Communication (NFC), and/or Radio Frequency (RF) network with communication links between the remote server 130 and the passive follower vehicle 110. In some embodiments, the network 104 may comprise direct communication links between any or all of the components 102, 102-1, 104, 110, 112, 114, 116a-c, 118, 130, 132, 134, 140 of the system 100. The sensor 116b may, for example, be directly interfaced or connected to one or more of the processing device 112 and/or the remote server 130 via one or more wires, cables, wireless links, and/or other network components, such network components (e.g., communication links) comprising portions of the network 104. In some embodiments, the network 104 may comprise one or many other links or network components other than those depicted in FIG. 1. The passive follower vehicle 110 may, for example, be connected to the remote server 130 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 102-1, 104, 110, 112, 114, 116a-c, 118, 130, 132, 134, 140 of the system 100. The network 104 may comprise one or more cellular telephone networks with communication links between the communication device 114 and the remote server 130, for example, and/or may comprise an NFC or other short-range wireless communication path, with communication links between the follower vehicle 110 and the yard 102-1, for example.

According to some embodiments, the passive follower vehicle 110 may comprise any type, configuration, and/or quantity of vehicle, manned, unmanned, autonomous, or semi-autonomous, that is or becomes known or practicable. The passive follower vehicle 110 may comprise, for example, an autonomous path-following transportation vehicle that is operable to follow one or more object vehicles and detect and process the respective LIDAR patterns being projected by the object vehicles. In some embodiments, the passive follower vehicle 110 may comprise the processing device 112 such as a Central Processing Unit (CPU) that executes instructions (not shown) stored in the memory device 140 to operate in accordance with embodiments described herein. The processing device 112 may, for example, execute one or more programs, modules, and/or routines that facilitate utilization of the sensor 116c and/or the communication device 114 to facilitate following of an object vehicle through the environment 102. The processing device 112 may comprise, in some embodiments, one or more Eight-Core Intel® Xeon® 7500 Series electronic processing devices According to some embodiments, the communication device 114 may comprise any wired and/or wireless communication object and/or network device such as, but not limited to, a Radio Frequency (RF) antenna, transmitter, and/or receiver. In some embodiments, the communication device 114 may comprise hardware, software, and/or firmware operable to enable wireless communications including, but not limited to, encoding and/or decoding modules, filters, and/or encryption and/or decryption modules. In some embodiments, the communication device 114 may comprise one or more output devices such as buzzers, lights, alarms, vibration devices, etc. The communication device 114 may comprise, for example, an ADAS output device that provides ADAS output to a driver of the passive follower vehicle 110 (in embodiments in which the passive follower vehicle does not comprise an autonomous vehicle but is rather controlled at least partially be an operator).

According to some embodiments, the input device 116a may comprise one or more of a throttle, a steering, and a brake control mechanism and/or interface via which a human operator (e.g., a remote human operator) may control the speed and/or direction of the passive follower vehicle 110 through the environment 102. According to some embodiments, the input device 116a may comprise one or more switches, levers, wheels, pedals, and/or interface elements capable of communicating speed, direction, etc. In some embodiments, the input device may comprise a port, cable, connection and/or other input mechanism configured to receive data descriptive of a plurality of LIDAR pattern data (e.g., LIDAR pattern geometries, frequencies, intensities, model numbers, make/manufacture, etc.).

In some embodiments, the location device 116b may comprise any type, quantity, and/or configuration of location identification and/or tracking device that is or becomes known or practicable. The location device 116a may comprise, for example, one or more Global Positioning System (GPS) devices, wireless signal triangulation devices, atomic clocks, etc.

According to some embodiments, the sensor 116c may comprise may any type, configuration, and/or quantity of sensor devices that are or become known or practicable. In some embodiments, the sensor 116c may comprise a Light Detection and Ranging (LIDAR), Laser Detection and Ranging (LIDAR), radar, sonar, Infrared Radiation (IR), RF, ultrasound, structured light, and/or imaging (e.g., stereo vision and/or 3-D camera) device operable to acquire data descriptive of an object vehicle being followed, the environment 102 and/or the environment feature 102-1 (e.g., a LIDAR pattern of the object vehicle) thereof. According to some embodiments, the sensor 116c may also or alternatively comprise a gyroscope, image, audio, and/or video capture and/or recording device, chemical detection device, and/or a light sensor. According to some embodiments, the sensor 116c may comprise various movement sensors such as speed/velocity sensors, pressure sensors, temperature sensors, accelerometers, Inertial Measurement Unit (IMU) devices, and/or tilt sensors. In some embodiments, the sensor 116c may comprise one or more high speed (e.g., high shutter speed) cameras, e.g., operable to detect and/or discern discrete time-separated instances of LIDAR projections comprising the environment feature 102-1.

In some embodiments, the maneuver device 118 may comprise any type, quantity, and/or configuration of mechanical, electrical, and/or electro-mechanical devices that are operable to control the path of the passive follower vehicle 110. The maneuver device 118 may comprise, for example, steering linkage, actuators, control surfaces, thrust vectoring devices, etc. In some embodiments, the maneuver device 118 may be coupled to and/or in communication with the propulsion device 132. The maneuver device 118 may comprise, for example, a steer-by-wire system that permits computerized control of the maneuvering of the follower vehicle 110. The maneuver device 118 and the propulsion device 132 may, for example, operate in a coordinated fashion (e.g., in response to commands from the processing device 112) to cause the passive follower vehicle 110 to follow a desired path and/or route through the environment 102. In embodiments in which the passive follower vehicle comprises an autonomous vehicle, the maneuver device may be omitted.

According to some embodiments, the propulsion device 132 may comprise any type, configuration, and/or quantity of propulsion devices that are operable to move the passive follower vehicle 110 from one location to another. The propulsion device 132 may comprise, for example, one or more motors, engines, gears, drives, propellers, fans, jets, nozzles, wheels, treads, and/or magnetic propulsion devices. According to some embodiments, the power device 134 may be electrically coupled to provide power to any or all of the propulsion device(s) 132, the communication device 114, the processing device 112, the input device 116a, the location device 116b, the sensor 116c, and/or the maneuver device 118. In some embodiments, the power device 134 may comprise a power source such as a solar panel, inertial generator, on-board generator, alternator, fuel-cell, external power supply port, etc. According to some embodiments, the power device 134 may also or alternatively comprise a power storage device such as one or more capacitors, batteries, fuel reservoirs or tanks, etc.

In some embodiments, the memory device 140 may store various logic, code, and/or applications, each of which may, when executed, participate in, facilitate, and/or cause passive follower vehicle operation and processing, as described herein. In some embodiments, the memory device 140 may comprise any type, configuration, and/or quantity of data storage devices that are or become known or practicable. The memory device 140 may, for example, comprise an array of optical and/or solid-state memory cards or hard drives configured to store sensor data, LIDAR pattern data, maneuvering data, object classification data, navigation data, road network data, rules of the road data, routing data (e.g., analysis formulas and/or mathematical models), credentialing and/or communication instructions, codes, and/or keys, and/or various operating instructions, drivers, etc. In some embodiments, the memory device 140 may comprise a solid-state and/or non-volatile memory card (e.g., a Secure Digital (SD) card, such as an SD Standard-Capacity (SDSC), an SD High-Capacity (SDHC), and/or an SD eXtended-Capacity (SDXC) and any various practicable form-factors, such as original, mini, and micro sizes, such as are available from Western Digital Corporation of San Jose, CA. While the memory device 140 is depicted as a stand-alone component of the follower vehicle 110, the memory device 140 may comprise multiple components. In some embodiments, a multi-component memory device 140 may be distributed across various devices and/or may comprise remotely dispersed components. Either of the follower vehicle 110 and/or the remote server 130 may comprise the memory device 140 or a portion thereof, for example.

Figure 2:
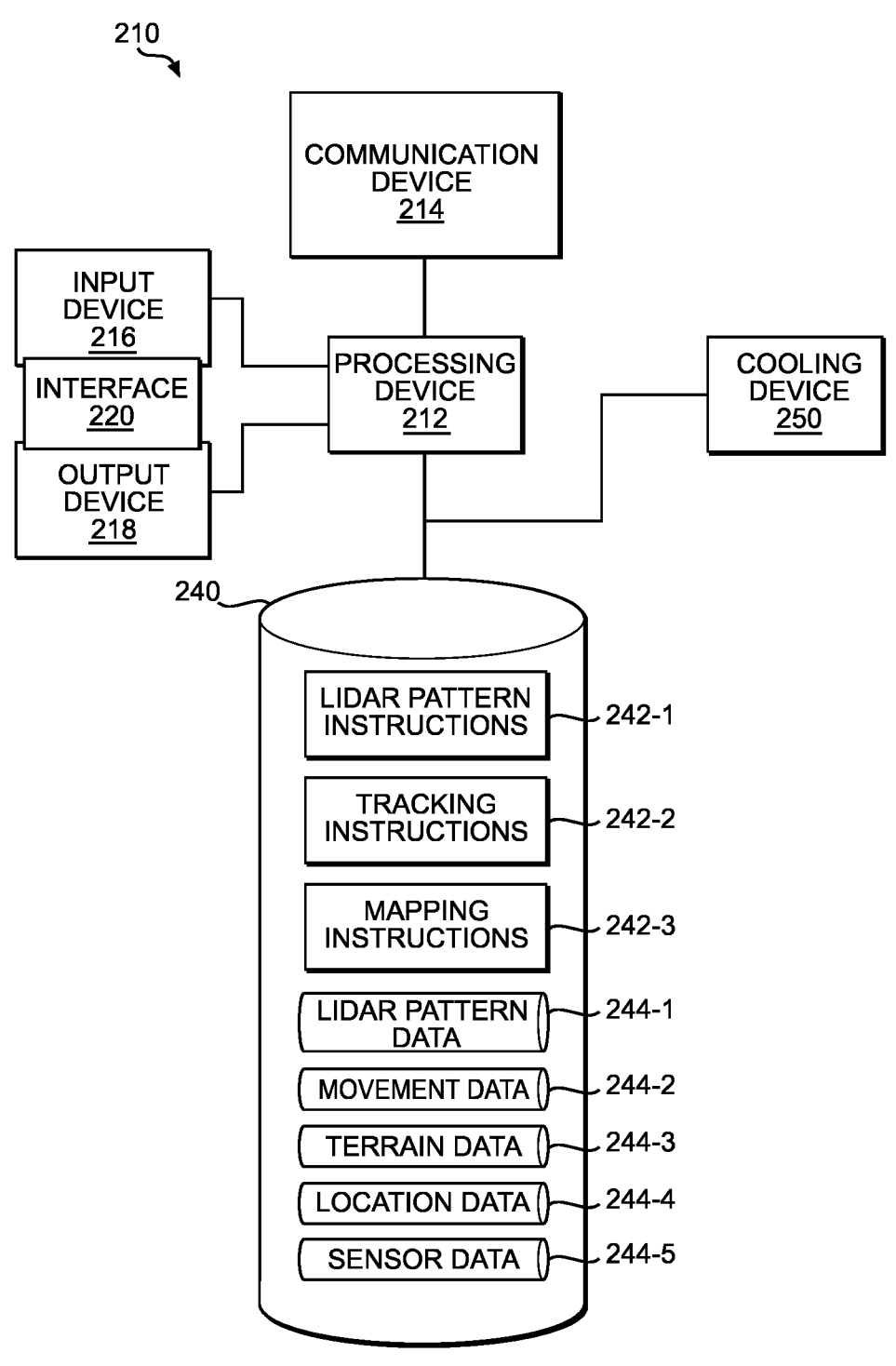
FIG. 2 is a block diagram of an apparatus according to some embodiments.

Turning to FIG. 2, a block diagram of an apparatus 210 according to some embodiments is shown. In some embodiments, the apparatus 210 may be similar in configuration and/or functionality to one or more of the passive follower vehicle 110 and/or remote server 130 of FIG. 1 herein. The apparatus 210 may, for example, execute, process, facilitate, and/or otherwise be associated with a method in which a passive follower vehicle is operable to recognize a LIDAR pattern being projected by an object vehicle (not shown), and utilize this pattern to determine (i) a characteristic (e.g., identifying information such as a manufacturer and/or model) of the LIDAR system projecting the pattern; (ii) at least one of a position and location of the object vehicle; and/or (iii) a map of the terrain or route being traveled by the object vehicle (e.g., in accordance with a 3D mapping methodology such as described herein with reference to FIG. 9).

In some embodiments, the apparatus 210 may comprise a processing device 212, a communication device 214, an input device 216, an output device 218, an interface 220, a memory device 240 (storing various programs and/or instructions 242 and data 244), and/or a cooling device 250. According to some embodiments, any or all of the components 212, 214, 216, 218, 220, 240, 242, 244, 250 of the apparatus 210 may be similar in configuration and/or functionality to any similarly named and/or numbered components described herein. Fewer or more components 212, 214, 216, 218, 220, 240, 242, 244, 250 and/or various configurations of the components 212, 214, 216, 218, 220, 240, 242, 244, 250 may be included in the apparatus 210 without deviating from the scope of embodiments described herein.

According to some embodiments, the processor 212 may be or include any type, quantity, and/or configuration of processor that is or becomes known. The processor 212 may comprise, for example, an Intel® IXP 2800 network processor or an Intel® XEON™ Processor coupled with an Intel® E7301 chipset. In some embodiments, the processor 212 may comprise multiple interconnected processors, microprocessors, and/or micro-engines. According to some embodiments, the processor 212 (and/or the apparatus 210 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 210 comprises a server, such as a blade server, necessary power may be supplied via a standard AC outlet, power strip, surge protector, and/or Uninterruptible Power Supply (UPS) device.

In some embodiments, the communication device 214 may comprise any type or configuration of communication device that is or becomes known or practicable. The communication device 214 may, for example, comprise a Network Interface Card (NIC), a telephonic device, a cellular network device, a router, a hub, a modem, and/or a communications port or cable. In some embodiments, the communication device 214 may be coupled to receive LIDAR pattern data, e.g., from the input device 216 and/or from a separate sensor device (not separately shown in FIG. 2). The communication device 214 may, for example, comprise a BLE and/or RF receiver device and/or a camera or other imaging device that acquires data descriptive of a location (e.g., projected LIDAR patterns at the location) and/or a transmitter device that provides the data to a remote server and/or server or communications layer (not separately shown in FIG. 2). According to some embodiments, the communication device 214 may also or alternatively be coupled to the processor 212. In some embodiments, the communication device 214 may comprise an IR, RF, Bluetooth™, Near-Field Communication (NFC), and/or Wi-Fi® network device coupled to facilitate communications between the processor 212 and another device (such as a remote user device, e.g., a tele-operations station, not separately shown in FIG. 2).

In some embodiments, the input device 216 and/or the output device 218 are communicatively coupled to the processor 212 (e.g., via wired and/or wireless connections and/or pathways) and they may generally comprise any types or configurations of input and output components and/or devices that are or become known, respectively. The input device 216 may comprise, for example, a knob, wheel, lever, shifter, pedal, button, switch, and/or other object that permits an operator (e.g., local or remote operator personnel) to control a speed and/or direction of the apparatus 210. In some embodiments, the input device 216 may comprise a sensor, such as a camera, sound, light, radar, RF, and/or proximity sensor, configured to measure and/or record values via signals to the apparatus 210 and/or the processor 212. According to some embodiments, the input device 216 may comprise a plurality of stereoscopic cameras, 3-D cameras, and/or high shutter speed cameras that are configured and/or oriented to capture data descriptive of one or more LIDAR patterns that have been projected (e.g., by a different object and/or vehicle) in an environment proximate to the apparatus 210. The output device 218 may, according to some embodiments, comprise a display screen and/or other practicable output component and/or device such as a sounder, light, vibration device, etc. The output device 218 may, for example, provide an interface (such as the interface 220) via which ADAS safety, warning, rules, and/or navigation data may be provided to a vehicle operator (e.g., via a mobile device application). According to some embodiments, the input device 216 and/or the output device 218 may comprise and/or be embodied in a single device, such as a touch-screen monitor. In accordance with some embodiments, input device 216 may comprise sensor 116c of FIG. 1.

The memory device 240 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 240 may, according to some embodiments, store one or more of LIDAR pattern instructions 242-1, tracking instructions 242-2, and/or mapping instructions 242-3, LIDAR pattern data 244-1, movement data 244-2, terrain data 244-3, location data 244-4, and/or sensor data 244-5. In some embodiments, the LIDAR pattern instructions 242-1, tracking instructions 242-2, and/or mapping instructions 242-3, LIDAR pattern data 244-1, movement data 244-2, terrain data 244-3, location data 244-4, and/or sensor data 244-5 may be utilized by the processor 212 to provide output information via the output device 218 and/or the communication device 214.

According to some embodiments, the LIDAR pattern instructions 242-1 may be operable to cause the processor 212 to process the LIDAR pattern data 244-1, movement data 244-2, terrain data 244-3, location data 244-4, and/or sensor data 244-5 in accordance with embodiments as described herein. LIDAR pattern data 244-1, movement data 244-2, terrain data 244-3, location data 244-4, and/or sensor data 244-5 received via the input device 216 and/or the communication device 214 may, for example, be analyzed, sorted, filtered, decoded, decompressed, ranked, scored, plotted, and/or otherwise processed by the processor 212 in accordance with the LIDAR pattern instructions 242-1 to identify, classify, categorize, measure, and/or compare stored and/or sensed LIDAR pattern data, as described herein.

In some embodiments, the tracking instructions 242-2 may be operable to cause the processor 212 to process the LIDAR pattern data 244-1, movement data 244-2, terrain data 244-3, location data 244-4, and/or sensor data 244-5 in accordance with embodiments as described herein. LIDAR pattern data 244-1, movement data 244-2, terrain data 244-3, location data 244-4, and/or sensor data 244-5 received via the input device 216 and/or the communication device 214 may, for example, be analyzed, sorted, filtered, decoded, decompressed, ranked, scored, plotted, and/or otherwise processed by the processor 212 in accordance with the tracking instructions 242-2 to compute and/or calculate trajectories, paths, movement, and/or location data of a leader/target vehicle (e.g., in coordination with the LIDAR pattern instructions 242-1), as described herein.

According to some embodiments, the mapping instructions 242-3 may be operable to cause the processor 212 to process the LIDAR pattern data 244-1, movement data 244-2, terrain data 244-3, location data 244-4, and/or sensor data 244-5 in accordance with embodiments as described herein. LIDAR pattern data 244-1, movement data 244-2, terrain data 244-3, location data 244-4, and/or sensor data 244-5 received via the input device 216 and/or the communication device 214 may, for example, be analyzed, sorted, filtered, decoded, decompressed, ranked, scored, plotted, and/or otherwise processed by the processor 212 in accordance with the mapping instructions 242-3 to generate mapping data such as topographic data, DEM data, and/or DTM data (e.g., in coordination with the LIDAR pattern instructions 242-1), as described herein.

According to some embodiments, the apparatus 210 may comprise the cooling device 250. According to some embodiments, the cooling device 250 may be coupled (physically, thermally, and/or electrically) to the processor 212 and/or to the memory device 240. The cooling device 250 may, for example, comprise a fan, heat sink, heat pipe, radiator, cold plate, and/or other cooling component or device or combinations thereof, configured to remove heat from portions or components of the apparatus 210.

Any or all of the exemplary instructions and data types described herein and other practicable types of data may be stored in any number, type, and/or configuration of memory devices that is or becomes known. The memory device 240 may, for example, comprise one or more data tables or files, databases, table spaces, registers, and/or other storage structures. In some embodiments, multiple databases and/or storage structures (and/or multiple memory devices 240) may be utilized to store information associated with the apparatus 210. According to some embodiments, the memory device 240 may be incorporated into and/or otherwise coupled to the apparatus 210 (e.g., as shown) or may simply be accessible to the apparatus 210 (e.g., externally located and/or situated).

Figure 3A:
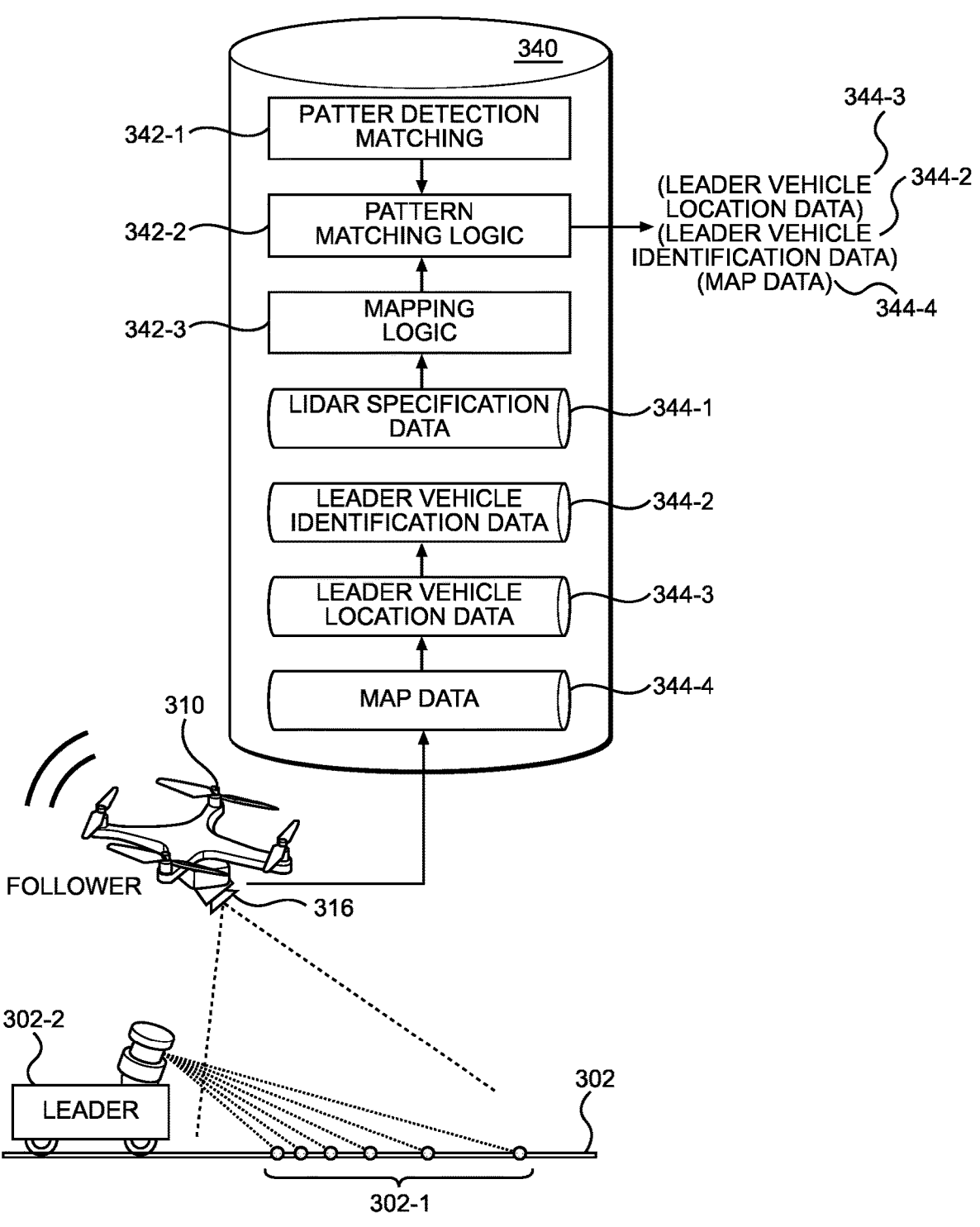
FIG. 3A and FIG. 3B are block and perspective diagrams of a system according to some embodiments.
Figure 3B:
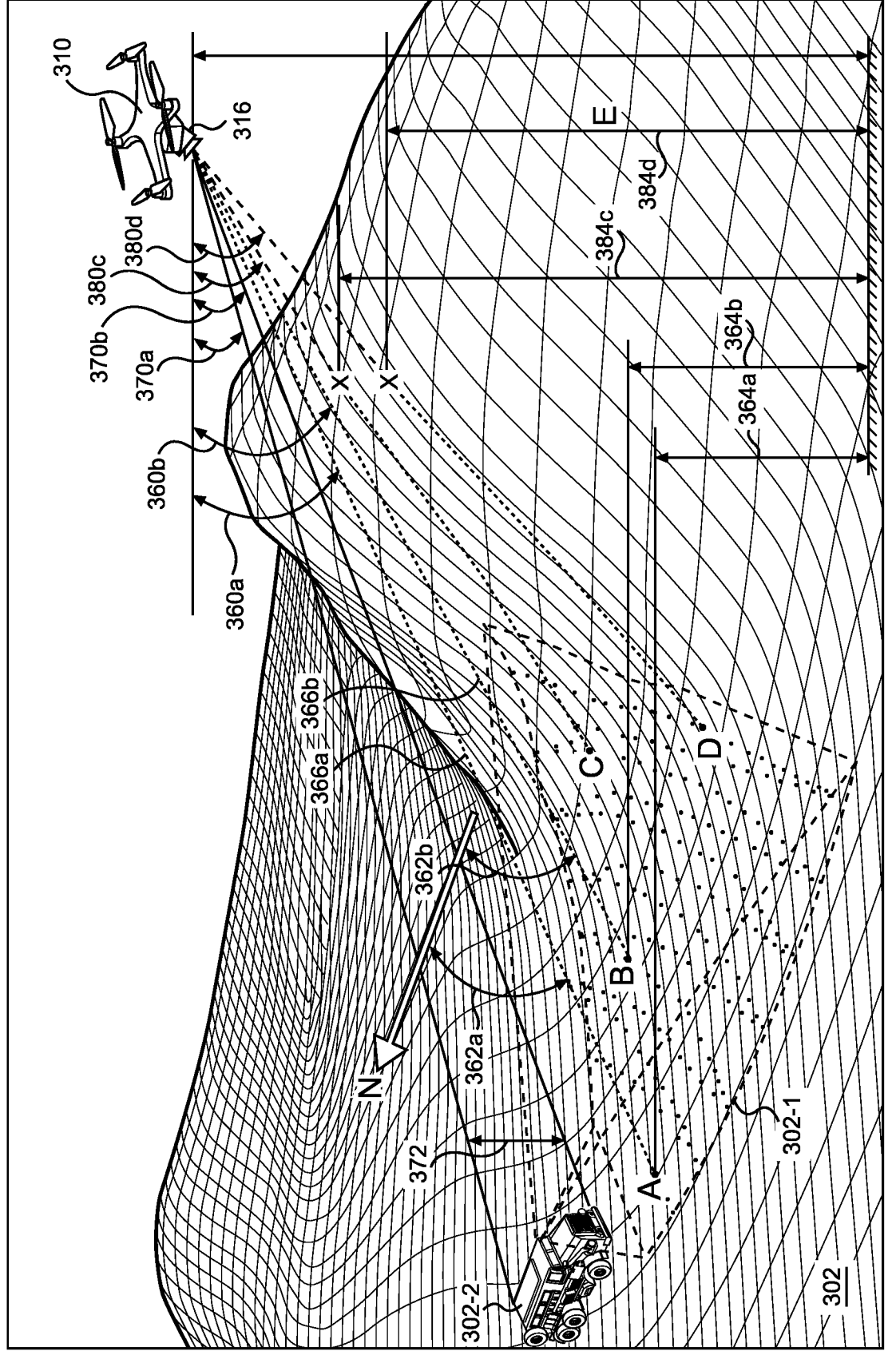

Turning now to FIG. 3A and FIG. 3B, block and perspective diagrams of a system 300 according to some embodiments are shown. In accordance with some embodiments, the system 300 may comprise a system of a passive follower vehicle (e.g., such as illustrated as passive follower vehicle 110 and/or remote server 130 of FIG. 1) and/or the apparatus 210 (FIG. 2). In some embodiments, the system 300 may comprise an environment 302 such as the flat ground surface and/or the wire-mesh visualization of terrain depicted for purposes of non-limiting example and ease of illustration in FIG. 3A and FIG. 3B, respectively. According to some embodiments, one or more LIDAR patterns 302-1 may be projected upon and/or within the environment 302 such as by a leader vehicle (i.e., object vehicle) 302-2. The leader vehicle 302-2 may comprise, for example, an autonomous vehicle that projects the one or more LIDAR patterns 302-1 to effectuate autonomous navigation of the environment 302. In some embodiments, the leader vehicle 302-2 may comprise a manned, autonomous, semi-autonomous, or non-autonomous vehicle that projects the one or more LIDAR patterns 302-1 to provide navigation, collision avoidance, maneuvering, and/or targeting functionality thereto.

In some embodiments, the system 300 may comprise a follower vehicle 310, e.g., depicted for purposes of non-limiting example as a quad-copter drone in FIG. 3A and FIG. 3B. According to some embodiments, the follower vehicle 310 may comprise a sensor 316 that is operable and oriented to capture and/or acquire data descriptive of the one or more LIDAR patterns 302-1. The sensor 316 may comprise one or more photo-sensors, sensor arrays, diodes, mirrors, optics, receptors, receivers, and/or imaging devices, for example, such as, but not limited to (i) one or more high speed cameras, (ii) a plurality of cooperatively oriented (e.g., stereoscopic) cameras, and/or (iii) a 3-D camera. In some embodiments, the sensor 316 may capture images (and/or other data) descriptive of the one or more LIDAR patterns 302-1 without itself projecting any LIDAR patterns. In some embodiments, the follower vehicle 310 may explicitly not comprise or not utilize, for example, any LIDAR equipment. In such a manner, for example, the follower vehicle 310 may acquire LIDAR data in the nature of the data descriptive of the one or more LIDAR patterns 302-1 in a passive manner.

It should be understood that any description herein of calculating or otherwise determining, by a passive follower vehicle and/or its tracking platform or system, any information, data and/or characteristic(s) of a leader vehicle is equally applicable to a determination of such information, data and/or characteristic(s) of the LIDAR of the leader vehicle. In other words, and by way of a non-limiting example, if reference is made to determining the pose of a leader vehicle, this may be interpreted as also (or alternatively) encompassing determining the pose of the LIDAR of the leader vehicle, and vice-versa.

According to some embodiments, the follower vehicle 310 may comprise (and/or be in communication with or have access to) a memory device 340 storing pattern detection logic 342-1, pattern matching logic 342-2, mapping logic 342-3, LIDAR specification data 344-1, leader vehicle identification data 344-2, leader vehicle location data 344-3, and/or map data 344-4. The follower vehicle 310 (and/or a processing device thereof; not separately shown) may, for example, utilize the sensor 316 to detect and/or capture information descriptive of the one or more LIDAR patterns 302-1 and may utilize (e.g., execute) the pattern detection logic 342-1 to classify, categorize, and/or identify one or more characteristics of the one or more LIDAR patterns 302-1. The pattern detection logic 342-1 may, in some embodiments, be utilized to measure, compute, and/or calculate, with respect to either or both of a first point "A" and a second point "B" of the one or more LIDAR patterns 302-1, one or more of: (i) a vertical angle 360*a-b*, (ii) a horizontal angle 362*a-b* (e.g., with respect to a compass heading and/or the cardinal direction North "N" as depicted), (iii) an elevation 364*a-b* (e.g., with respect to a datum such as Mean Sea Level (MSL), Ground Level (GL), etc.), and/or (iv) a distance 366*a-b* (e.g., between the respective points "A", "B" and the follower vehicle 310 (and/or the sensor 316 thereof)). In some embodiments, any or all of these measurements/dimensions 360*a-b*, 362*a-b*, 364*a-b*, 366*a-b* may be measured, computed, calculated, derived, and/or otherwise identified or determined at a first point in time, "T1" (not separately depicted), and in some embodiments at additional points in time thereafter (e.g., "T2", "T3", etc.). In some embodiments, the pattern detection logic 342-1 may utilize any or all of the measurements/dimensions 360*a-b*, 362*a-b*, 364*a-b*, 366*a-b* (at the first time "T1" and/or additional times) to identify, construct, and/or derive a pattern of the one or more LIDAR patterns 302-1. According to some embodiments, such as in the case that the one or more LIDAR patterns 302-1 comprise a time-lapsed pattern of projected laser points (e.g., points "A" and "B"), the first point "A" may be sensed at the first time "T1" and the second point "B" may be sensed at a second point in time "T2".

In some embodiments, the map data 344-4 may comprise position, location and/or orientation (e.g., pose) data of the follower vehicle 310 (and/or the sensor 316 thereof), e.g., derived from various stored data, GPS signals, and/or accelerometer and/or other IMU data. The follower vehicle 310 may "know", for example, where it is located in space and time (e.g., geolocation coordinates, and elevation "E" (e.g., with respect to the datum), and a synchronized first time "T1"). According to some embodiments, the pattern detection logic 342-1 may comprise stored instructions, formulas, models, etc. that may be utilized to calculate and/or compute locations for the first and second points "A", "B" based on the measurements/dimensions 360*a-b*, 362*a-b*, 364*a-b*, 366*a-b*. With knowledge of a position, location and orientation (e.g., pose) of the sensor 316, for example, the follower vehicle 310 may compute the locations for the first and second points "A", "B" by (i) determining/computing the vertical angles 360*a-b* and the horizontal angles 362*a-b*, thereby identifying a bearing or vector for each of the points "A", "B".

In the case that the map data 344-4 comprises data descriptive of the terrain of the environment 302, the bearing or vector of the points "A", "B" and the known location of the follower vehicle 310 may be utilized to identify/compute points of intersection of the bearings and the known (or estimated) terrain elevation. In such a manner, for example, the points of intersection (e.g., intersection with a 3-D point cloud defining the terrain of the environment 302; e.g., stored in the map data 344-4) may comprise known (or estimated) elevations at those points in the environment 302 which may accordingly be assigned to (or as) the elevations 364*a-b*. In some embodiments, such as in the case that the map data 344-4 does not comprise terrain data, the sensor 316 and/or a different component of the follower vehicle 310 such as a rangefinder (not shown) may be utilized to directly measure the distances 366*a-b*. In either case, given the bearings and one or more of the elevations 364*a-b* and the distances 366*a-b*, the locations of the points "A", "B" may be computed (e.g., based on the known/current location of the follower vehicle 310).

According to some embodiments, neither the capability to directly measure the distances 366*a-b* or nor the terrain data may be necessary to compute the locations of the points "A" and "B". In the case that the leader vehicle 302-2 itself is sensed by the sensor 316, for example, vertical angles 370*a-b* to different points on the leader vehicle 302-2 may be identified and stored data (e.g., the leader vehicle identification data 344-2) may be utilized to identify a known distance 372 between the points. In some embodiments for example, data descriptive of the leader vehicle 302-2 (e.g., from the sensor 316) may be utilized to categorize, classify, and/or identify the leader vehicle 302-2, e.g., in comparison to stored vehicle data such as the leader vehicle identification data 344-2. These angles 370*a-b* and the known distance 372 may be utilized to compute a scale of the one or more LIDAR patterns 302-1 and/or distance to the leader vehicle 302-2 (which itself may be utilized to scale the one or more LIDAR patterns 302-1). Once scaled, and with the bearings having been derived, the locations of the points "A" and "B" (and of the remainder of the one or more LIDAR patterns 302-1) may, in some embodiments, be computed (e.g., by having utilized the scale of the known vehicle dimensions to derive distance and/or elevation information).

In some embodiments, the locations of the points "A", "B" may be utilized, e.g., by the pattern detection logic 342-1, to compute and/or identify a locational relationship between the points "A", "B". This relationship, whether based solely on the points "A", "B" or on additional points (not separately labeled) in the one or more LIDAR patterns 302-1, may define a detected LIDAR pattern. As depicted in FIG. 3B, for example, the locations of the points "A", "B" may be utilized to identify that the one or more LIDAR patterns 302-1 comprise a "zig-zag" pattern. In some embodiments, the identified LIDAR pattern may be compared and/or contrasted to the LIDAR specification data 344-1, e.g., by execution of the pattern matching logic 342-2, to identify a type and/or categorization of the one or more LIDAR patterns 302-1. It may be determined, for example, that the identified "zig-zag" pattern comprising points "A" and "B" is indicative of the leader vehicle 302-2 employing a LIDAR device (not separately labeled) comprising an oscillating mirror (e.g., a first type of LIDAR). In some embodiments, differences in the intensity/brightness, timing, and/or positioning of the points "A" and "B" in the one or more LIDAR patterns 302-1 may be compared to the stored LIDAR specification data 344-1 to identify matches (or likelihood of matches; e.g., with confidence metrics) indicative of: (i) a make/manufacture of the LIDAR device, (ii) a model of the LIDAR device, and/or (iii) a particular unit of LIDAR device.

In some embodiments, such as in the case that the terrain data for the environment 302 is stored in the map data 344-4, the follower vehicle 310 (and/or the pattern matching logic 342-2) may utilize the terrain data to compute expected distortions of the one or more LIDAR patterns 302-1 and may utilize the distortions when comparing the detected LIDAR pattern of the one or more LIDAR patterns 302-1 to the stored LIDAR specification data 344-1. According to some embodiments, the comparison of the detected pattern to the stored patterns may comprise a computation of a confidence level, score, rank, weight, etc. of a plurality of compared characteristics. In such a manner, for example, one or more highest confidence, scored, ranked, and/or weighted matches (e.g., stored patterns with the most similarities to the identified pattern) may be identified as being similar to the detected pattern. According to some embodiments, the closest match may be chosen. In some embodiments, multiple likely or possible matches may be chosen. The one or more chosen matches may then be re-evaluated at a subsequent time with subsequent data, for example, to determine whether any of the matches have increased or decreased in confidence/score/etc. At the subsequent time, any highest confidence, scored, ranked, weighted, etc. matched pattern may be selected as the most likely match for the identified pattern.

According to some embodiments, the identification of the type/match of the one or more LIDAR patterns 302-1 may be utilized for various advantageous purposes. In the case that the location of the leader vehicle 302-2 (e.g., the leader vehicle location data 344-3) is not directly sensed by the sensor 316 and/or is otherwise not capable of direct computation or derivation, the matching of the one or more LIDAR patterns 302-1 may be utilized in conjunction with stored data (e.g., the LIDAR specification data 344-1 and/or the map data 344-4) regarding the matched pattern to derive the location of the leader vehicle 302-2 (e.g., the leader vehicle location data 344-3). Once the locations of the points "A" and "B" are computed, for example, an estimation of where the projection of the one or more LIDAR patterns 302-1 originated from (i.e., the leader vehicle 302-2 and/or the LIDAR device thereof) may be derived and/or computed. An example application of such a process is described in more detail with respect to FIG. 4A, FIG. 4B, and FIG. 4C herein.

In some embodiments, the identification of the type/match of the one or more LIDAR patterns 302-1 may be utilized to map the terrain of the environment 302 (e.g., to define some or all of the map data 344-4). Once the one or more LIDAR patterns 302-1 are matched to known/stored patterns, for example, data may be derived from various characteristics of the matched pattern. With reference to the example shown in FIG. 3B, for example, the pattern matching for the one or more LIDAR patterns 302-1 may be utilized to identify one or more additional points "C" and/or "D" that should (e.g., based on stored characteristic data in the LIDAR specification data 344-1) be present in the one or more LIDAR patterns 302-1. In some embodiments, vertical angles $380c\text{-}d$ to each of the respective points "C" and "D" may be determined from the matched pattern data and the follower vehicle 310 (e.g., via an execution of the mapping logic 342-3) may determine that neither of the points "C" and "D" are visible (e.g., have been detected by the sensor 316) at, e.g., the current time "T1". As both the vertical angles $380c\text{-}d$ and the positions of the points "C" and "D" are known from the matched pattern data, and as it may be presumed in some embodiments that a lack of line-of-sight to the points "C" and "D" is indicative of an obstruction between the points "C", "D" and the sensor 316, elevations $384c\text{-}d$ of the obstruction (e.g., at respective intersection and/or interception points "X") may be computed. Repeated execution of the mapping logic 342-3 at subsequent times (e.g., "T2", "T3", etc.), with respect to different positions of the leader vehicle 302-2, and/or from different positions and/or orientations of the follower vehicle 310, may be utilized to populate the map data 344-4 with a plurality of geolocated points (e.g., "A", "B", "C", "D", "X") that are derived by comparison between data captures and calculations from the different times/locations. Time and/or orientation-shifted data descriptive of any single point "X", for example, may be utilized to triangulate and/or refine the location information descriptive thereof. According to some embodiments, navigation of the follower vehicle 310 may be specifically effectuated to place identified obstructions (e.g., points "X") between the one or more LIDAR patterns 302-1 and the field of view of the sensor 316 of the follower vehicle 310 to identify the extents and/or characteristics of the obstruction.

Fewer or more components 302, 302-1, 302-2, 310, 316, 340, 342-1, 342-2, 342-3, 344-1, 344-2, 344-3, 344-4 and/or various configurations of the depicted components 302, 302-1, 302-2, 310, 316, 340, 342-1, 342-2, 342-3, 344-1, 344-2, 344-3, 344-4 may be included in the system 300 without deviating from the scope of embodiments described herein. In some embodiments, the components 302, 302-1, 302-2, 310, 316, 340, 342-1, 342-2, 342-3, 344-1, 344-2, 344-3, 344-4 may be similar in configuration and/or functionality to similarly named and/or numbered components as described herein. In some embodiments, the system 300 (and/or portion thereof) may comprise a passive follower vehicle tracking and/or mapping platform programmed and/or otherwise configured to execute, conduct, and/or facilitate one or more methods as described herein.

Turning now to FIGS. 4A-4C and 5-11, illustrated therein are various applications, use-cases and methodologies (collectively "methodologies") that may be implemented using a system such as the system 300 described with reference to FIGS. 3A and 3B. The methodologies of the following figures are described with reference to a passive follower vehicle and its attendant systems, components and functionalities, which may be embodied as one or more of passive follower vehicle 110 or remoter server 130 (FIG. 1) and apparatus 210 (FIG. 2).

Figure 4A:
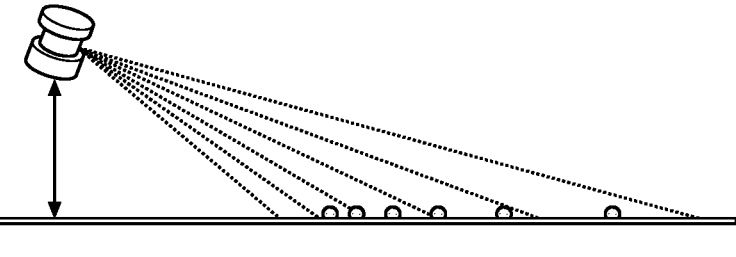
FIGS. 4A-4C comprise an illustration of an example application and methodology consistent with one or more embodiments described herein.
Figure 4B:
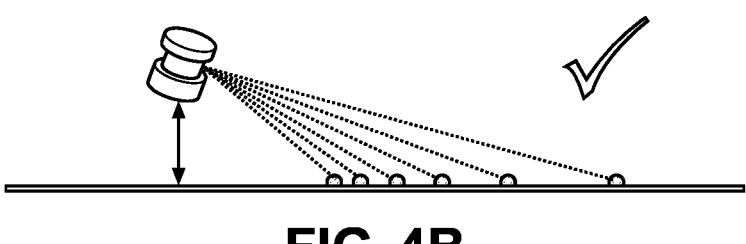
Figure 4C:
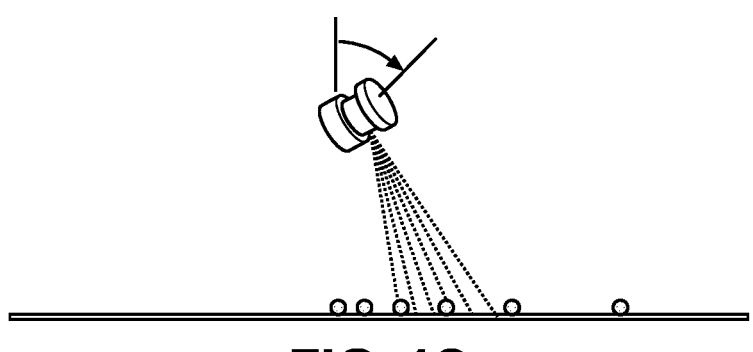

Referring now to FIGS. 4A-4C, illustrated therein is an example system and methodology consistent with embodiments described herein, wherein pattern matching is used to determine a location of a leader vehicle. In accordance with some embodiments, given the detected illumination pattern of the leader vehicle's LIDAR, the location of the leader vehicle may be determined. As described herein, Applicant has recognized that, in accordance with some embodiments, the illumination pattern of an object or leader vehicle (or its LIDAR) may be utilized by a passive follower vehicle to determine various information and/or characteristics of the object vehicle and/or the LIDAR of the object vehicle. One example of such information or characteristic is the pose of the object vehicle and/or its LIDAR, e.g., the position, location and/or orientation of the object vehicle and/or its LIDAR. For example, a candidate illumination pattern can be computed or otherwise determined for a given candidate LIDAR pose. In accordance with one embodiment, this is compared to the detected pattern. If the pattern matches (e.g., matches within a desired tolerance range), then the pose of the actual LIDAR may be considered to have been identified. In some embodiments, the match may not be exact and a figure of merit or a probability of match can be assigned.

In some embodiments, a large list of candidate poses may be precomputed or otherwise determined and the system may be operable to check all or many of them. Other embodiments could comprise iterating on the pose, using previous match results to generate new candidate poses to refine the match.

FIGS. 4A-4C illustrate three candidate LIDAR poses and their corresponding patterns indicated by the rays radiating from each respective candidate LIDAR. The actual detected pattern (e.g., as detected by a follower vehicle) is indicated as the dots along the horizontal line along the bottom of each figure. As indicated by the checkmark in the non-limiting and illustrative example of FIGS. 4A-4C, the middle candidate pattern illustrated in FIG. 4B matches the detected pattern best. Accordingly, the system may determine that the candidate LIDAR pose corresponding to the candidate patter illustrated in FIG. 4B is the pose of the follower vehicle that emitted the detected pattern, at the time the pattern was detected.

In accordance with some embodiments, after a match is made, the system waits for a new illumination pattern to be detected and the matching process begins again. The accuracy of each match may be susceptible to noise. Successive matches may be filtered, using a Kalman Filter as one example, to produce a smoother, less noisy position output. The individual matches can be weighted (e.g., using the figure of merit or probability of a match). In accordance with some embodiments, a filter can be utilized to estimate position and velocity. In accordance with some embodiments, a simplified version of such a process could be programmed to compute, or detect directly, the center of illumination and track that. The follower vehicle could, for example, be assumed a given (e.g., average or estimated) distance behind the center of illumination.

Figure 5A:
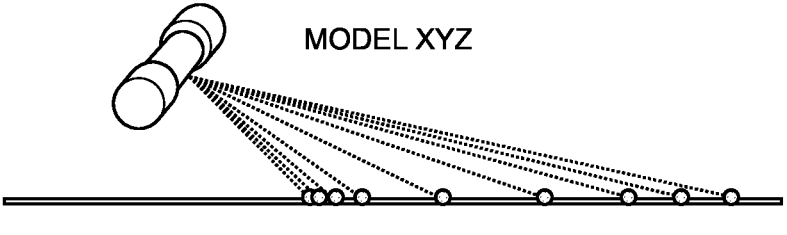
FIGS. 5A-5C comprise an illustration of an example application and methodology consistent with one or more embodiments described herein.
Figure 5B:
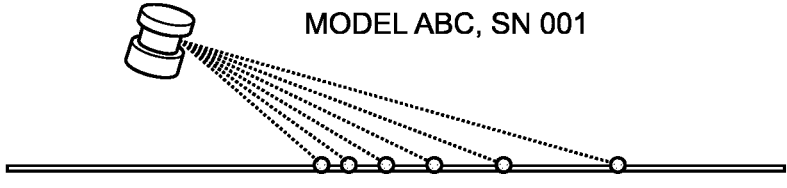
Figure 5C:
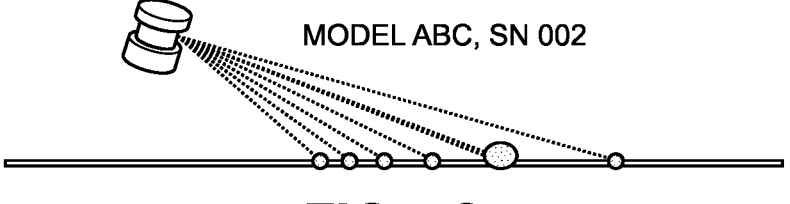

Referring now to FIGS. 5A-5C, illustrated therein is an example system and methodology that utilizes pattern matching to distinguish among different models of LIDARs, in accordance with some embodiments. Applicant has recognized that different models of LIDARs have different scan patterns that produce different illumination patterns which can be used to discriminate between models. These differences that may be detected and used to discriminate between LIDARs are caused by characteristics such as, without limitation: (i) number of emitters; (ii) laser Frequency/ies used; (iii) scanning pattern; (iv) multi-frequency or single frequency; (v) constant frequency or moving frequency; (vi) laser pulse width; (vii) scanning sequence; (viii) beam to beam timing; and/or (ix) saccade timing for scanner. Even LIDARs of the same model may have differences due to manufacturing tolerances, mirrors that aren't flat, laser diods that have different power outputs and beam patterns, etc.

FIGS. 5A-5C illustrate that hypothetical LIDAR model XYZ has a different scan pattern than hypothetical Model ABC, and therefore a different illumination pattern. A different unit of LIDAR, even though of the same model ABC, has a bright diode that produces a bright spot in the illumination pattern that may be used to differentiate this particular LIDAR unit from other units of the ABC model.

In accordance with some embodiments, a particular matching process may be utilized to determine which make or model of a given object vehicle, or a particular unit of an object vehicle that corresponds to a given make or model, the process assuming a particular candidate LIDAR from a database of LIDARs. The position of a candidate LIDAR may be computed (e.g., in a manner as described with reference to FIGS. 3A and 3B). This may be done for each potential LIDAR in the database, or for a subset that is narrowed down in accordance with one or more criteria. The candidate LIDAR that is determined to be the best match may be selected.

In some embodiments, differences between the measured illumination pattern and the nominal pattern can be recorded and analyzed. Such differences, such as a laser dot that is offset, missing, brighter, etc. can be caused by variation in the reflectance of the ground, etc. or because of variations of that particular LIDAR. If that particular LIDAR is different, (say SN 002 with a bright laser), then that difference will move with the LIDAR. If the bright spot was caused by a more reflective spot in the terrain, then the difference will not move with the LIDAR. By keeping track of these differences, a model can be built for that particular LIDAR unit. This new model can go into the database and be used to identify that particular LIDAR unit in the future.

In some embodiments, LIDARs can be made to signal the follower by changing their illumination pattern. This can be accomplished by means such as changing the position or brightness of a laser dot, changing the timing of when they fire, firing a dot twice, changing the laser color or frequency, etc. This can be accomplished, for example, using a signal dot, multiple dots, a changing pattern of dots, etc. One purpose of such signaling may be to transmit information or simply to identify the particular LIDAR unit to a follower vehicle.

Figure 6A:
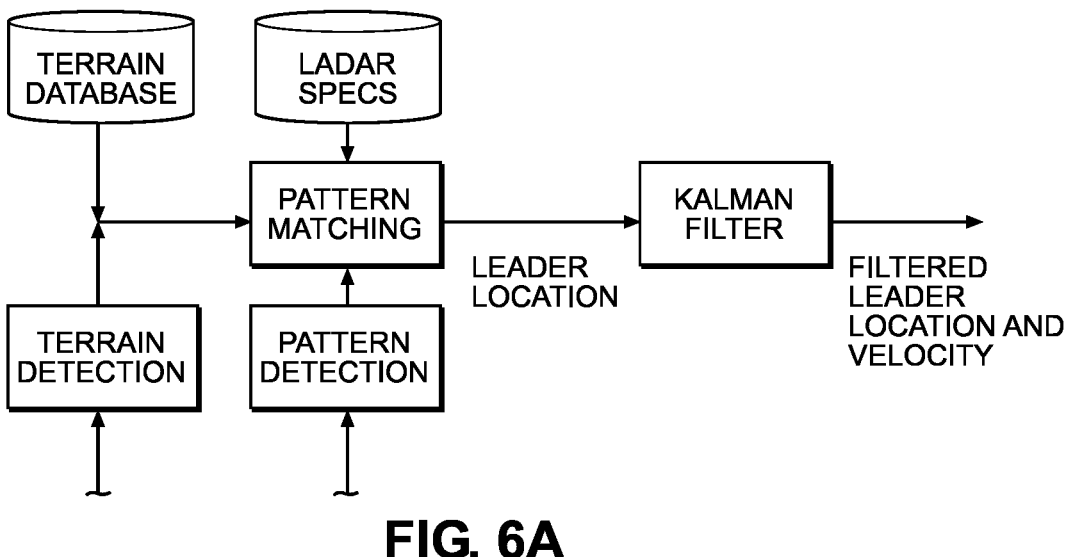
FIGS. 6A-6C comprise an illustration of an example application and methodology consistent with one or more embodiments described herein.
Figure 6B:
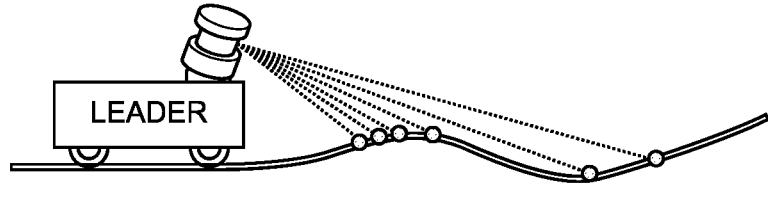
Figure 6C:
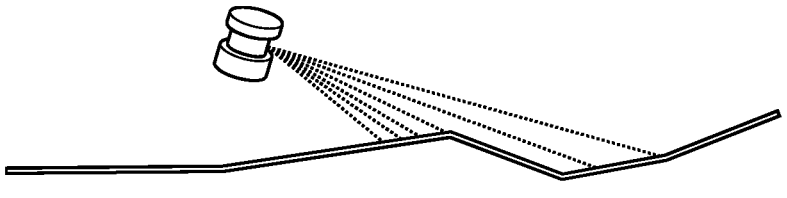

Referring now to FIGS. 6A-6C, illustrated therein is an example system and methodology for utilizing terrain data and filtering to process data for an object vehicle traveling on uneven terrain, in accordance with one embodiment. Applicants have recognized that a different illumination pattern will result if the terrain is uneven, as compared to flat terrain. If the variation is small, the terrain can be assumed flat, and processed as normal. For example, if a Figure of Merit is computed for each match and used by the Kalman Filter, then uneven terrain would have a worse Figure of Merit and the match would be de-weighted. Alternately, a model of the terrain could be used in the pattern matching process. In accordance with one embodiment, the system may access and utilize a terrain model, such as from a priori data or derived in real time using the follower vehicle's terrain sensors. Errors in the terrain model may result in errors in the pattern matching. Filtering the location may result in a better position estimate. FIG. 6A shows a possible system that utilizes terrain data and filtering. FIG. 6B shows effects of uneven terrain on the illumination pattern. FIG. 6C shows a candidate LIDAR pose and the resulting candidate illumination pattern using a terrain model.

Figure 7:
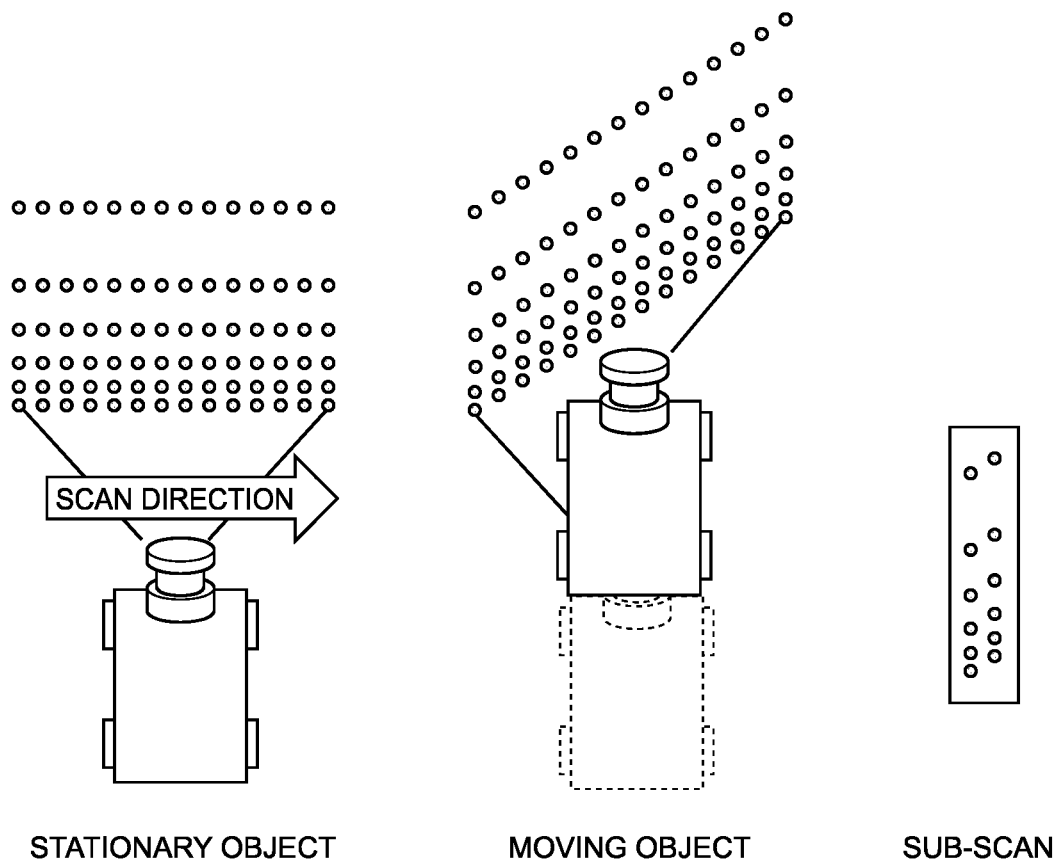
FIG. 7 comprises an illustration of an example application and methodology consistent with one or more embodiments described herein, for use in a specific situation.

Referring now to FIG. 7, illustrated therein is an example methodology that accounts for situations in which a LIDAR of an object vehicle has a slow scan rate as compared to the speed of the object vehicle. Applicants have recognized that in such situations, the illumination pattern is deformed when the object vehicle is moving as compared to when the object vehicle is stationary. The amount of deformation depends on how long it takes to do a single scan and the speed of the object vehicle. Longer scan times and faster object vehicle speeds deform the pattern more.

Several things can be done to account for this. For example, in some embodiments, an illumination pattern can be computed assuming a LIDAR is moving at a particular speed. In some embodiments, a series of these speed based illumination patterns can be matched to determine the LIDAR and speed. In some embodiments, a method may comprise breaking the scan pattern into multiple sub-scan patterns. Because each sub-scan pattern takes less time to scan, the object vehicle moves less during the sub-scan, and the deformation for the sub-scan is less. Each sub-scan pattern could be matched separately and a filter such as the Kalman Filter could be utilized to combine the results. The detection of sub-scan patterns can be accomplished because the scanning LIDAR illuminates the overall pattern over time as it scans. The first sub-scan pattern would be illuminated first, then the second, and so on. The detected pattern would be subdivided by time into the corresponding sub-patterns.

Figure 8:
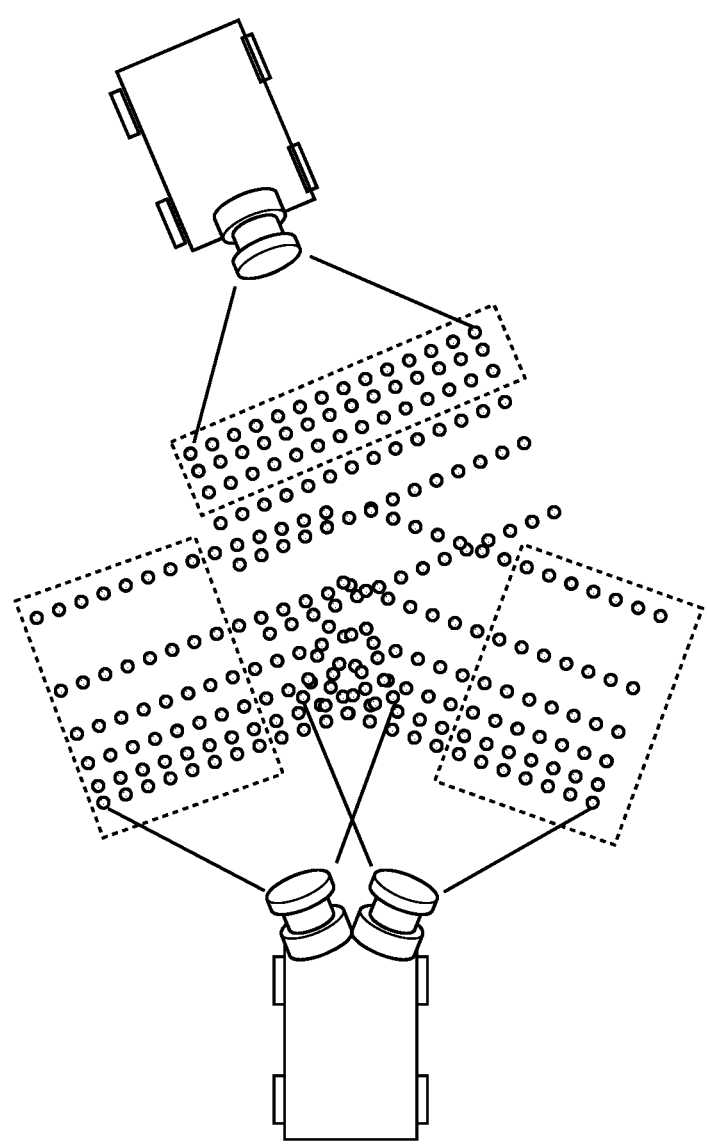
FIG. 8 comprises an illustration of an example application and methodology consistent with one or more embodiments described herein, for use in a specific situation.

Referring now to FIG. 8, illustrated therein is an example system and methodology for situations in which object vehicles have multiple LIDARs which may have overlapping scan patterns and/or situations in which multiple object vehicles operate in the same area with overlapping scan patterns. In some situations, the LIDARs may be of different color, brightness, or timing. This would allow the illumination pattern detection module to distinguish or segregate the patterns for each LIDAR. In one embodiment, a separate matching module could be run for each LIDAR in such a situation. If the multiple patterns cannot be distinguished segregated, there are several methods that can be used to obtain matches.

For example, in one embodiment a separate matching module could be run for each LIDAR using the full set of detected points as input. This would most likely lead to some mismatches where a candidate dot is matched with a detected dot of a different LIDAR. A lower confidence of the measurement could be assigned to account for this.

In another embodiment, each of the LIDARs could be matched together, simultaneously. This method may comprise a significantly larger search space where each LIDAR can move independently. For example, multiple LIDARs on the same object vehicle could be constrained to move together in such embodiments.

In yet another embodiment, a method may match only sub-scans that are not overlapped. In the non-limiting example of FIG. 8, potential clean sub-scan areas are shown in the dashed rectangles.

Figure 9:
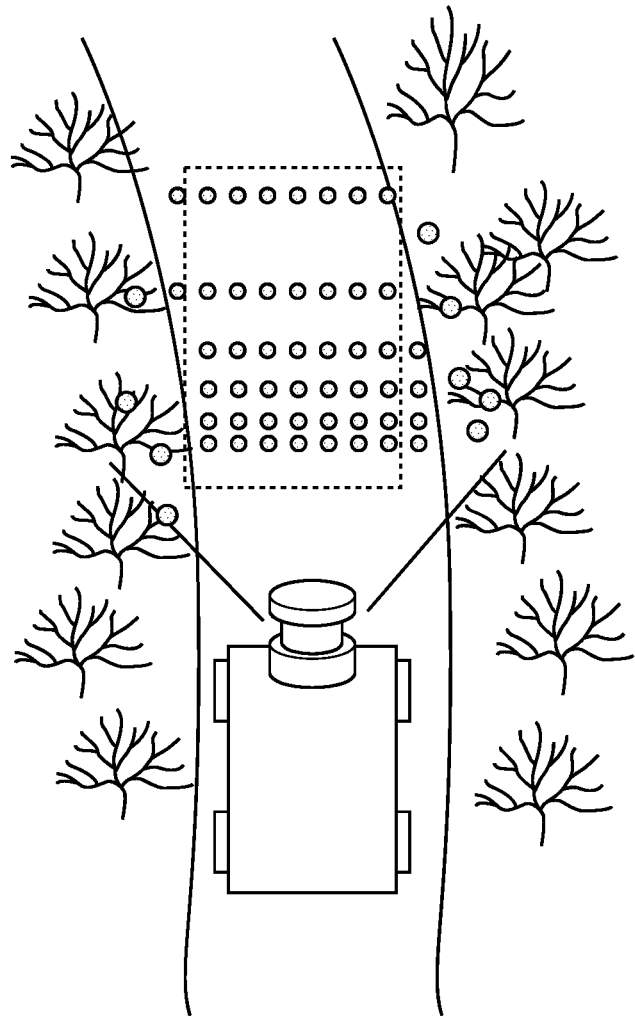
FIG. 9 comprises an illustration of an example application and methodology consistent with one or more embodiments described herein, for use in a specific situation.

Referring now to FIG. 9, illustrated therein is an example system and methodology for identifying an object vehicle LIDAR that is operating in areas with obstacles or terrain features such as vegetation, buildings, other vehicles, etc. Applicant has recognized that in such situations the illumination pattern may be disrupted in areas outside of the road or flat areas of the terrain. Additionally, in some situations a part of the illumination pattern that is on a road may be unviewable from the follower vehicle's sensors, blocked by the vegetation, buildings, or even the object vehicle. In such cases, in some embodiments the system may be programmed to only match the sub-scan on the road that is visible to the follower vehicle. The location of the road may be, for example, known a priori, detected by sensors on board the follower vehicle, or deduced by the illumination pattern on the ground or the lack of it.

In accordance with some embodiments, the system of the passive follower vehicle (or a remote system in communication with the passive follower vehicle, that is operable to receive or access the data obtained by the passive follower vehicle utilizing the LIDAR of the object vehicle), may be operable to utilize the data/information determined from the LIDAR pattern or signals of the object vehicle to generate a terrain map of the terrain being traversed by the object vehicle. For example, in accordance with some embodiments, a single or multiple IR imagers of such a system may be utilized to generate three-dimensional (3D) maps or terrain models utilizing the LIDAR patterns or other indirect emissions from object vehicle. The imagers may be operable to utilize the information or data derived from the detected LIDAR pattern or other signals being emitted by the object vehicle to generate the maps or models. Depending whether a single imager is being used or multiple imagers are being used, the methods used for creating the point clouds can be made more redundant and precise.

In one example implementation, a receiver that records the scanning LIDAR patterns of the object vehicle(s) and has some information about the object vehicle(s) may be operable to determine (either directly or by inference/deduction) a significant amount of information about the terrain being traversed by the object vehicle. For example, if the both the returns and the source of the emitter (LADAR or the object vehicle) are viewable in an image obtained by the passive follower vehicle, then the system may be programmed to determine that there is no obstruction between the emitter (the object vehicle emitting a LADAR emission) and the spot on the ground. Moreover, by recognizing the scanning pattern of the particular system (as described herein, and particularly with respect to FIGS. 3A and 3B), then, the distance between the passive follower vehicle and the object vehicle can be determined.

In another example, a shape or profile of the ground being traversed by the object vehicle may be deduced as the deformation of the known scan pattern given the pose of a receiver or sensor of the passive follower vehicle (or the pose of the follower vehicle itself). As described herein, a particular scan pattern defines a set of unit vectors that are projected on the scene at known intervals. By knowing the distance to the object vehicle or its LADAR (from the scale of the scan pattern), the shape of the terrain can be determined using the following example methodology:

1. The position and velocity of the object vehicle may be determined in accordance with the systems and methods described herein, and particularly with respect to FIGS. 3A and 3B;

2. For each ground hit, there is a line of empty space that connects the detected illuminated spot of a pattern with the sensor of the follower vehicle that, by definition, is empty and therefore devoid of obstacles that otherwise would have blocked the laser beam from the object vehicle to the spot being sensed;

3. A representation (voxelized or otherwise) is constructed where the spaces between the sensor and each laser hit is marked as empty and therefore devoid of obstacles; and 4. The remaining voxels not marked empty constitute the terrain being mapped.

In an alternate embodiment, multiple (non-collocated) receivers or sensors (e.g., such as a sensor 116*c*, FIG. 1) are utilized to triangulate the position of each hit. Presuming timing information of the particular scan patterns is known in conjunction with accurate time synchronization of the different receivers, the emissions reflected on the ground and surrounding obstacles provide "artificial" features that can be used to map the terrain. The advantages of the process described herein over standard stereo technique is that the process can work more accurately in areas where no features are present, and the process can work at night given that AV vehicles drive that area.

As opposed to SAR or other radar techniques often used for mapping areas, the method described herein may be considered "passive" as the receiver system or sensor(s) of the follower vehicle is not emitting anything to generate the maps, it is instead using the emissions (e.g., LIDAR patterns) from object vehicle(s) to accomplish the task.

Figure 10:
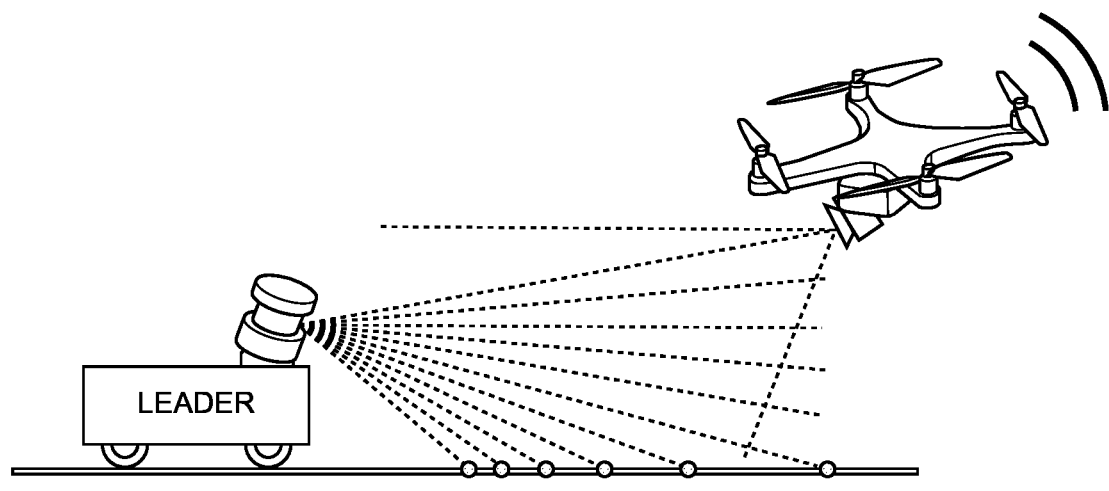
FIG. 10 comprises an illustration of an example application and methodology consistent with one or more embodiments described herein, for use in a specific situation.

Referring now to FIG. 10, illustrated therein is an example system and methodology for situations in which a follower vehicle can see the object vehicle's LIDAR directly. This provides the system an ability to determine a direction of the object vehicle and a direct measurement of its location.

Figure 11:
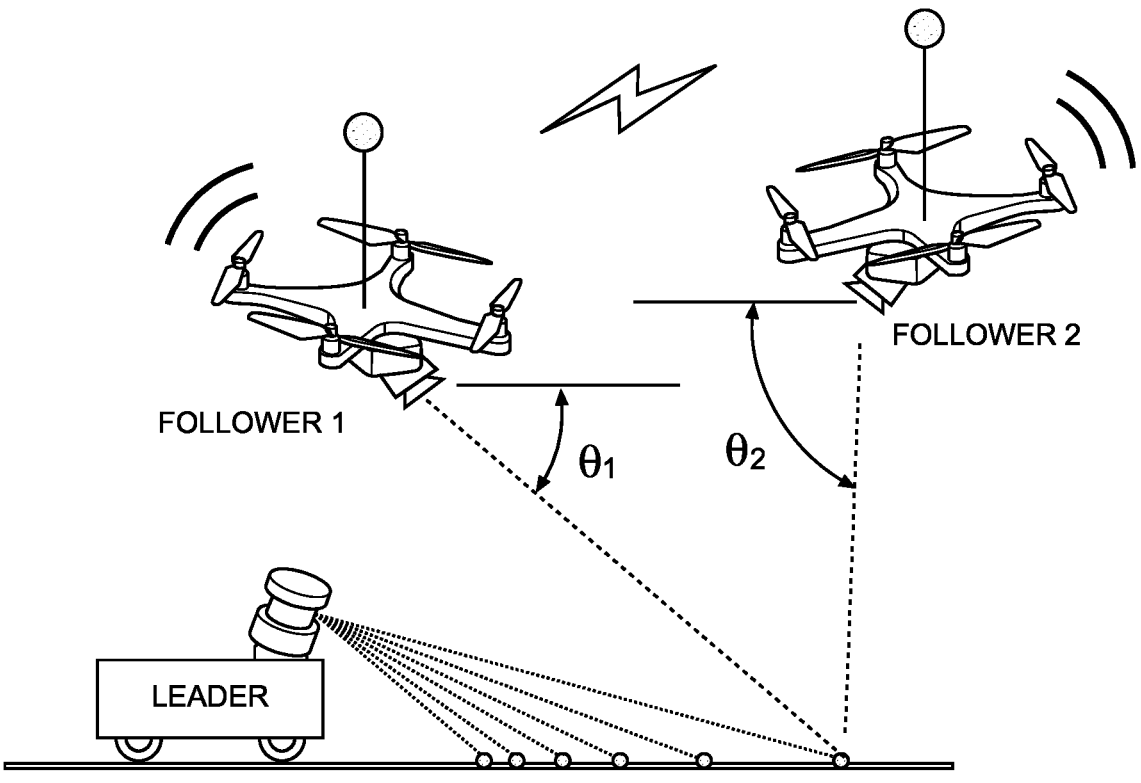
FIG. 11 comprises an illustration of an example application and methodology consistent with one or more embodiments described herein, for use in a specific situation.

Referring now to FIG. 11, illustrated therein is an example system and methodology for situations in which multiple follower vehicles with a communication device cooperatively track an object vehicle. In accordance with one embodiment, such coordination could be at the Filter level, where each follower provides it's estimate of the leader's location as input to the Filter. In another embodiment, the coordination could be at a lower level where the illumination pattern is used to triangulate the object vehicle's location.

Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Neither the Title (set forth at the beginning of the first page of this patent application) nor the Abstract (set forth at the end of this patent application) is to be taken as limiting in any way as the scope of the disclosed invention(s).

Headings of sections provided in this patent application are for convenience only, and are not to be taken as limiting the disclosure in any way.

All definitions, as defined and used herein, should be understood to control over dictionary definitions, definitions in documents incorporated by reference, and/or ordinary meanings of the defined terms. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The indefinite articles "a" and "an," as used herein in the specification and in the claims, unless clearly indicated to the contrary, should be understood to mean "at least one" or "one or more".

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

As utilized herein, the terms "program" or "computer program" may refer to one or more algorithms formatted for execution by a computer. The term "module" or "software module" refers to any number of algorithms and/or programs that are written to achieve a particular output and/or output goal—e.g., a 'login credentialing' module (or program) may provide functionality for permitting a user to login to a computer software and/or hardware resource and/or a 'shipping' module (or program) may be programmed to electronically initiate a shipment of an object via a known and/or available shipping company and/or service (e.g., FedEX®). The terms "engine" or "software engine" refer to any combination of software modules and/or algorithms that operate upon one or more inputs to define one or more outputs in an ongoing, cyclical, repetitive, and/or loop fashion. Data transformation scripts and/or algorithms that query data from a data source, transform the data, and load the transformed data into a target data repository may be termed 'data transformation engines', for example, as they repetitively operate in an iterative manner upon each row of data to produce the desired results.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system comprising a first vehicle that is operable to detect a second vehicle using a LIDAR pattern projected by the second vehicle, the system comprising:

at least one sensor operable to detect a light detection and ranging (LIDAR) pattern projected onto a surface of an environment by a LIDAR device of second vehicle being followed by the first vehicle;

at least one position detecting mechanism operable to detect a current position of the first vehicle;

a memory storing a first set of data, the first set of data comprising a plurality of unique LIDAR patterns and, for each unique LIDAR pattern in the first set of data, corresponding identifying information indicative of the LIDAR device that projects said LIDAR pattern; and a first controller operatively coupled to the at least one sensor and the memory, the first controller comprising one or more first processors and first non-transitory computer readable storage media storing instructions that, when executed by the one or more first processors, cause the first controller to:

(a) detect, via the at least one position detecting mechanism, a current position of the passive follower vehicle at a first point in time, thereby determining self-position data for the first point in time;

(b) detect, at the first point in time and via the at least one sensor, a second data being emitted by the second vehicle, wherein the second data comprises at least a first LIDAR pattern being projected by a LIDAR device of the second vehicle as it travels along a route through the environment;

(c) match, using the first set of data, the first LIDAR pattern to one of the plurality of unique LIDAR patterns; and (d) infer, using the match, identification data defining a LIDAR system that is projecting the first LIDAR pattern, thereby inferring identification data for the second vehicle.

2. The system of claim 1, wherein the instructions, when executed by the one or more first processors, further cause the first controller to:

determine, using at least one of the first LIDAR pattern, the self-position data and the identification data for the second vehicle, at least one of an orientation, a location and a position of the second vehicle at the first point in time.

3. The system of claim 2, wherein the instructions, when executed by the one or more first processors, further cause the first controller to:

determine, at a second point in time, a second position of the second vehicle;

determine a change in the position of the second vehicle over time; and generate a map, based on the change in the position, of a route the second vehicle is traversing through the environment.

4. The system of claim 1, wherein the identification data defining the LIDAR system that is projecting the first LIDAR pattern comprises data defining at least one of a make and model of the LIDAR system.

5. The system of claim 1, wherein the identification data defining the LIDAR system that is projecting the first LIDAR pattern comprises data defining a particular unit of the LIDAR system.

6. The system of claim 1, wherein the second data comprises LIDAR point clouds emitted by the LIDAR device of the second vehicle as reflected on the environment and wherein the instructions, when executed by the one or more first processors, further cause the first controller to:

generate a 3-D map of the environment using the LIDAR point clouds.

7. The system of claim 6, wherein the 3-D map is generated using the second data comprising the first LIDAR pattern of the second vehicle and third data comprising at least one additional LIDAR pattern of at least one additional vehicle followed by the first vehicle.

8. The system of claim 6, wherein causing the first controller to generate the 3-D map comprises causing the first controller to:

utilize the first LIDAR pattern to generate the 3-D map; and determine empty areas of the 3-D map to be areas that fill a gap between the self-position data and a point perceived in the environment.

9. The system of claim 1, wherein the at least one sensor comprises a plurality of sensors and wherein the instructions, when executed by the one or more first processors, further cause the first controller to:

triangulate each point of the first pattern being projected by the LADAR device of the second vehicle.

10. The system of claim 1, wherein the first vehicle is an aerial vehicle comprising at least one of a drone, airship, airplane or satellite.

11. The system of claim 1, wherein the second vehicle is a ground vehicle.

12. The system of claim 1, wherein the instructions, when executed by the one or more first processors, further cause the first controller to:

determine a pose difference between the first vehicle and second vehicle.

13. The system of claim 12, wherein the first vehicle is a drone and wherein the pose difference is utilized by the first controller to estimate at least one of a location and speed of the second vehicle.

14. The system of claim 1, wherein the instructions, when executed by the one or more first processors, further cause the first controller to:

detect a change in the LIDAR pattern being projected by the LIDAR device of the second vehicle; and decrypt a communication from the second vehicle based on the change in the LIDAR pattern.

15. The system of claim 1 wherein the instructions, when executed by the one or more first processors, further cause the first controller to:

detect, via the at least one sensor, a second LIDAR pattern being projected by the LIDAR device of the second vehicle as it travels along a route through the environment; and match, using the first set of data, the second LIDAR pattern to one of the plurality of unique LIDAR patterns.

16. The system of claim 1, wherein the instructions, when executed by the one or more first processors, further cause the first controller to:

approximate a speed of the second vehicle using at least one of (i) a "center of mass" of points illuminated via the first LIDAR pattern; (ii) a "center of mass" of areas that are densely illuminated via the first LIDAR pattern; and (iii) a "center of mass" of areas that are determined by the first vehicle to be flat.

17. The system of claim 1, wherein the first controller is operable to determine elevation data for the environment utilizing one of: (i) elevation data for the environment as stored in the memory; (ii) elevation data for the environment as stored in a remote database accessible to the first controller; (iii) second data sensed by the sensor; and (iv) flat earth assumptions.

18. The system of claim 1, wherein the second data comprises data defining illumination of a road the second vehicle is traversing as well as data defining illumination of areas of the environment outside of the road and wherein the instructions, when executed by the one or more first processors, further cause the first controller to:

redact from the second data the data defining illumination of areas of the environment outside of the road and utilize the data defining illumination of a road the second vehicle is traversing.

19. The system of claim 1 where the second vehicle comprises a fixed facility.

20. The system of claim 1, wherein the first vehicle and the second vehicle each comprises a vehicle in a convoy of vehicles, the first vehicle being positioned behind the second vehicle in said convoy, and wherein second vehicle includes at least one second sensor operable to determine whether the first vehicle is following the second vehicle.

21. The system of claim 1 where the follower is a second vehicle in a convoy and the first vehicle has sensors pointing backwards to sense if the vehicles are being followed.

22. The system of claim 1, wherein the instructions, when executed by the one or more first processors, further cause the first controller to:

detect an emitter of the LIDAR device of the second vehicle.

23. The system of claim 1, wherein the instructions, when executed by the one or more first processors, further cause the first controller to:

determine third data, the third data comprising at least a portion of the first LIDAR pattern as projected on the second vehicle;

process the third data separately from the second data, thereby recognizing that the third data is not projected on the route.

24. The system of claim 1, further comprising at least one third vehicle that is also following the second vehicle, and wherein the instructions, when executed by the one or more first processors, further cause the first controller to:

triangulate a position of the first LIDAR pattern using third data received from the at least one third vehicle.

25. The system of claim 1, wherein the instructions, when executed by the one or more first processors, further cause the first controller to identify and track at least one additional second vehicle.

* * * * *